United States Patent [19]
Yoshida et al.

[11] Patent Number: 5,104,420
[45] Date of Patent: Apr. 14, 1992

[54] HARD ABRASIVE PARTICLE AND METHOD OF PRODUCING SAME

[75] Inventors: Katsuhito Yoshida; Kazuwo Tsuji, both of Itami, Japan

[73] Assignee: Sumitomo Electric Industries, Ltd., Osaka, Japan

[21] Appl. No.: 533,095

[22] Filed: Jun. 4, 1990

[30] Foreign Application Priority Data

Jun. 15, 1989 [JP] Japan ............................ 1-153125

[51] Int. Cl.$^5$ ............................................ B24D 3/00
[52] U.S. Cl. ........................................ 51/293; 51/295; 51/309; 428/699; 428/701
[58] Field of Search ..................... 51/293, 295, 309; 428/699, 701

[56] References Cited

U.S. PATENT DOCUMENTS

| | | | |
|---|---|---|---|
| 3,142,595 | 7/1964 | Wentroy, Jr. ............... | 143/171 |
| 4,011,064 | 3/1977 | Lee et al. ..................... | 51/295 |
| 4,297,387 | 10/1981 | Beale ............................ | 51/295 |
| 4,734,339 | 3/1988 | Schachner et al. ........... | 428/701 |

Primary Examiner—William R. Dixon, Jr.
Assistant Examiner—Willie J. Thompson
Attorney, Agent, or Firm—Wenderoth, Lind & Ponack

[57] ABSTRACT

The present invention relates to hard abrasive particles comprising diamond nuclei and cubic boron nitride layers coated on said diamond nuclei and a method of producing the same.

Diamond has the highest hardness but has not been used as grinding materials, abrasive compounds, cutting materials and the like of the iron group metals due to the reactivity thereof upon them at high temperatures.

Accordingly, the present invention provides hard abrasive particles comprising diamond nuclei and single crystal or polycrystal cubic boron nitride layers coating a surface of said diamond nuclei, in which the diamond nuclei are connected with the cubic boron nitride layers among atoms thereof, as materials having the hardness equal to that of diamond and capable of using for the grinding, the abrasion and the like of the iron group metals and a method of producing the same.

7 Claims, 3 Drawing Sheets (x 200)

HARD ABRASIVE PARTICLE AND METHOD OF PRODUCING SAME

DETAILED DESCRIPTION OF THE INVENTION

1. Field of the Invention

The present invention relates to hard abrasive particles comprising diamond nuclei and cubic boron nitride layers coated on said diamond nuclei and a method of producing the same.

2. Prior Art

As every body knows, diamond is a substance hardest on the earth and cubic boron nitride (hereinafter referred to as cBN) is a substance having a hardness next to diamond.

On account of such the hardness, diamond and cBN have been widely used for grinding materials, abrasive compounds, cutting materials and the like.

In particular, cBN has been widely used for the grinding and the like of the iron group metals on account of the superior chemical stability thereof.

It has been known for a long time that diamond and cBN can be artificially synthesized under high temperature and pressure conditions and at present they have been industrially produce.

As for a substance comprising diamond and cBN, there has been proposed in U.S. Pat. No. 3,142,595 a P—P type or P-N type semiconductor junction crystal, in which P type diamond is grown on a cBN substrate of P type or N type semiconductor, and in U.S. Pat. No. 4,734,339 there has been proposed a substance, in which a diamond layer is coated around boron nitride nuclei by the use of the gaseous phase synthetic method.

However, the substance, in which cBN is coated on the surface of the diamond nuclei, has not been obtained by the prior arts.

PROBLEMS TO BE SOLVED BY THE INVENTION

As above described, the problem is that there is no substance which has both the hardness equal to diamond and chemical stability against the iron group metals.

It has been guessed that a substance which is composed of a diamond nucleus and the cBN layer grown thereon may have the features of both the highest hardness and chemical stability. But such a substance has not been obtained until we invented the method, because the diamond nucleus is extinguished under high temperature and high pressure when cBN is grown around the nucleus.

In order to solve the problems above mentioned, we have achieved this invention of a substance and a method of producing the same which has the features of both the highest hardness and the chemical stability to the iron group metals, through a hard study for obtaining them.

That is to say, the present invention provides hard abrasive particles comprising diamond nucleus and single crystal or polycrystal cBN coating a surface of said diamond nucleus.

OPERATION

The present invention is described below with reference to the drawings.

Figure 1:
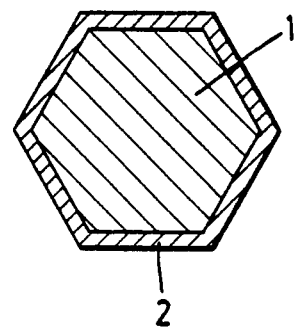
FIG. 1 is a general drawing showing hard abrasive particles according to the present invention.

FIG. 1 illustrates a general drawing of the hard abrasive particle obtained through the present invention. A diamond nucleus 1 is surrounded by cBN layer 2, and each atom of the first cBN layer 2 is bonded to the each atom of the surface of the diamond nucleus, as illustrated in FIG. 2.

Because of such composition as diamond, the hardest material on earth, is surrounded by cBN layer, which is inert to iron group metals, the hard abrasive particles obtained through the present invention have the features of both the highest hardness and the chemical stability.

Figure 2:
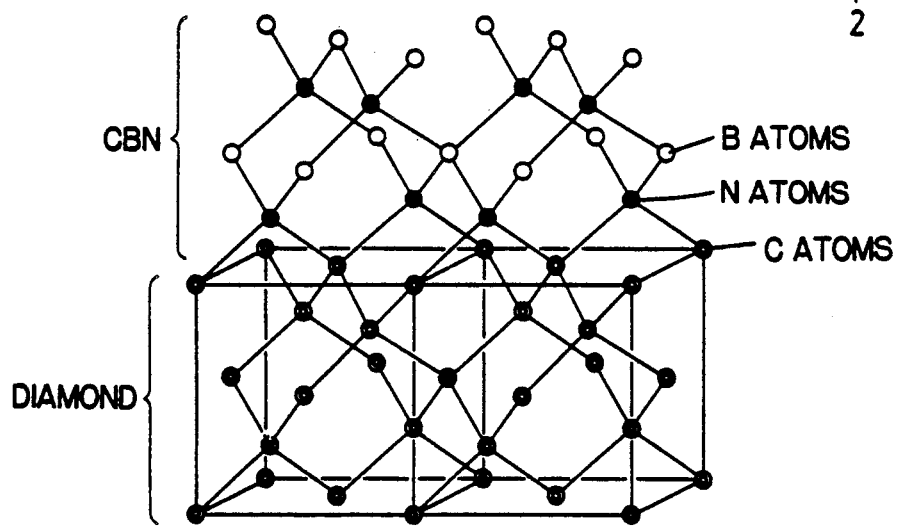
FIG. 2 is a diagram showing a crystal structure of diamond and single crystal cBN.

FIG. 2 illustrates the crystal structures of cBN and diamond, and in the FIG. 2 ● indicates N atoms, O indicates B atoms, and ⊙ indicates C atoms. As obvious from FIG. 2, cBN has the zinc blende type structure similar to that of diamond. Furthermore, diamond and cBN has the lattice constant of 3.567Å and 3.615Å respectively, that is to say there is a difference of merely about 1.3% between them, and also the thermal expansion coefficient of diamond and cBN is $4.50 \times 10^{-6} K^{-1}$ (700° C.) and $4.30 \times 10^{-6} K^{-1}$ (750° C.) respectively, that is to say they are remarkably close to each other, so it has been thought that it is may be possible to grow cBN on diamond epitaxially but it has never been realized. Until we invented the method, it has been unable to grow cBN under the condition which the diamond nuclei can exist stably.

We have analyzed the causes of the failure to grow cBN on the diamond nuclei, and have found that the diamond nuclei is oxidized to disappear under the condition of cBN being synthesized. And we have confirmed this by the fact that if the oxygen is completely removed from inside the cell in which cBN is grown, cBN can be grown on diamond without the extinction of the diamond nuclei under the condition of both diamond and cBN are thermodynamically stable which is shown by the shaded range in FIG. 3. And so the substances of which the oxidized energy at high temperatures is lower than that of diamond work for removing oxygen from inside the cell in which cBN is grown.

Figure 4:
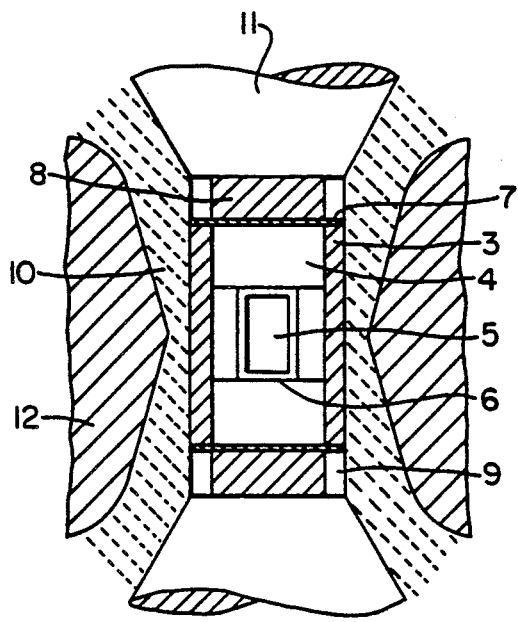
FIG. 4 is a diagram showing an apparatus used for obtaining the hard abrasive particles according to the present invention.

Next, FIG. 4 illustrates an apparatus for producing the hard abrasive particles according to the specific operative examples. The apparatus and its internal construction are same with those generally used for producing diamond and cBN. The substances of which the oxidized energy at high temperatures is lower than that of diamond are added to the mixture of the solvent and hexagonal boron nitride in the reaction cell 5 in FIG. 4.

The substances of which the oxidized energy at high temperatures is lower than that of diamond are supposed to be Mg, Al, Ca, V, Zr and the like.

Thus the abrasive particles obtained through the present invention have the hardness equal to diamond by the direct bond of diamond and cBN atoms.

However, since the diamond atoms have less effect on hardness with the increase of the thickness of the cBN layer, it is desirable that the thickness of said cBN layer is 1/5 times or less the particle sizes of the diamond nuclei.

In addition, in the hard abrasive particles obtained through the present invention, cBN is grown around the diamond nuclei, so that this cBN layer serves as the protective layer against the iron group metals.

Therefore, the hard abrasive particles mentioned and produced by the present invention have the features of both the highest hardness and the chemical stability against the iron group metals.

Next, FIG. 4, which illustrates the high temperature and high pressure generating apparatus used for producing the hard abrasive particles is explained in detail.

Referring to FIG. 4, inside the reaction cell 5 is heated up to the aimed temperature by supplying alternating or direct electric current through heater 3 made of graphite. The reaction cell 5 is surrounded by capsule 6 made of molybdenum.

Capsule 6 is electrically insulated by pressure medium 4, usually made of hexagonal boron nitride (hBN). Pressure medium 4 is closed or sealed at each end by conducting end disks 7. The material of disks 7 is unimportant to the present invention, since the function of the disk is merely to serve as a means of conducting current to heater 3. Thus, any conducting metal may be employed for disks 7 which will withstand evaluated temperatures and pressures. Positioned adjacent each disk 7 is an insulating disk 8 made of pyrophyllite. An annular conducting ring 9 made of alloy steel surrounds each of disks 8. The electric current is supplied through punches 11 made of WC-Co alloy. Pressure medium 10 made of pyrophyllite insulates the electric current and the heat from die 12.

The reaction cell 5 is staffed with hBN, the solvents, the substances having the oxidized energy lower than that of diamond, and the diamond nuclei. The substances having the oxidized energy lower than that of diamond are used in the form of powders, particles, or foils depending upon the forms in which they are generally used.

That is to say, Ca, Mg, V, and the like are generally used in the form of powders or particles and they are added to the hBN source and/or the solvent.

Furthermore, Al, Ti, Zr, and the like are generally used in the form of powders or foils and they are added to the hBN source and/or the solvent in the form of powders or wrapped around the pressed body of the hBN and the solvent mixture.

Figure 3:
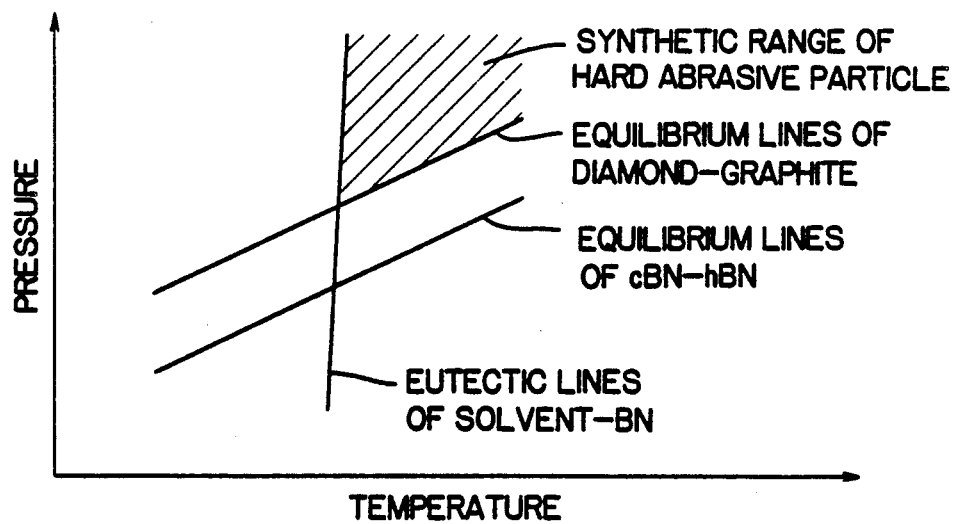
FIG. 3 is a diagram showing a range of manufacturing conditions of the hard abrasive particles according to the present invention.

Thus, if the temperature and pressure conditions are set within the shaded range in FIG. 3, hBN can be dissolved into the solvents and then deposited on the diamond nuclei in the form of cBN because of the relative difference between hBN and cBN in the solubility to the solvents under the condition of cBN being stable.

SPECIFIC OPERATIVE EXAMPLES

The following examples illustrate the present invention.

EXAMPLE 1 hBN powders, $Li_3BN_2$ powders as the solvent and diamond abrasive particles of 0.1 karat having particle sizes of 200 to 300 μm were mixed and the mixture was pressed to be turned into a pressed body having a diameter of 4 mm and a height of 9 mm. Zr foils having a diameter of 4 mm and a thickness of 0.2 mm were arranged top and bottom of the resulting pressed body as the deoxidizing agent and then staffed in the reaction cell 5 surrounded by the capsule 6 made of molybdenum in the apparatus shown in FIG. 4.

Then, the reaction cell 5 was held for 1 hour under the high-temperature and high-pressure conditions of 65 Kb and 1,700° C. to confirm the growth of polycrystal cBN around the diamond abrasive particles.

Figure 5:
FIG. 5 is a photograph (×200) showing the structure of the hard abrasive particles produced in the Example 1 taken by the scanning electron microscope.

The thus obtained hard abrasive particles were observed with scanning electron microscope (×200) with the result shown in FIG. 5

Figure 6:
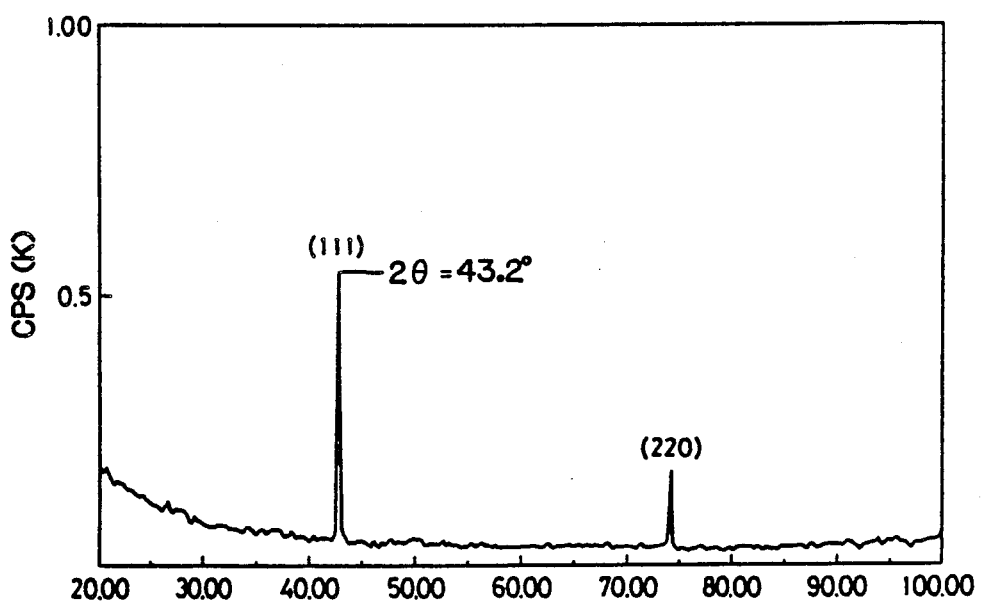
FIG. 6 is an X-ray diffraction chart of the hard abrasive particles produced in the Example 1.

In addition, these hard abrasive particles were identified by the X-ray diffraction method with the results shown in FIG. 6. The peak was detected in the vicinity of $2\theta = 43.2°$ and it was confirmed that the surface was coated with cBN.

EXAMPLES 2 to 10

The hard abrasive particles identical with those obtained in EXAMPLE 1 were obtained from the hBN powders, the $Li_3BN_2$ powders, the diamond abrasive particles having the particles sizes shown in Table 1 and deoxidizing agents under the same conditions as those in EXAMPLE 1.

In addition, the surface of the abrasive particles having the particle sizes close to 1 mm obtained in EXAMPLE 8, 9 and 10 was made smooth by means of the diamond grindstone #8000 and then tested on the hardness at a load of 500 g and a measuring time of 15 seconds by means of the micro Vickers hardness tester with the results shown in Table 1.

For comparison, 5 pieces of single crystal cBN were synthesized by the usually known synthetic method and tested on the hardness in the same manner as in the EXAMPLES.

In addition, the Vickers hardness shown in Table 1 is a mean value of several values measured at several points of the same one abrasive particle.

TABLE 1

| EXAMPLE No. | Particle sizes of diamond abrasive particles (μm) | Deoxidizing agent | Vickers hardness Hv (kg/mm$^2$) |
|---|---|---|---|
| 2 | 1 to 6 | Mg | — |
| 3 | do. | Al | — |
| 4 | do. | Zr | — |
| 5 | 3 to 10 | V | — |
| 6 | do. | Ti | — |
| 7 | do. | Ca | — |
| 8 | 850 to 1,000 | Mg | 6,670 |
| 9 | do. | Al | 6,130 |
| 10 | do. | Zr | 6,520 |
| COMPARATIVE EXAMPLE | not using | not using | 4,150 |

It has been confirmed from EXAMPLES 2 to 7 in Table 1 that according to the present invention, cBN is grown around the diamond abrasive particles without extinction even the diamond abrasive particles having the particle sizes of several μm.

In addition, it has been confirmed from EXAMPLES 8 to 10 and COMPARATIVE EXAMPLE that the abrasive particles according to the present invention were remarkably improved in hardness in comparison with the conventional cBN abrasive particles.

EFFECTS OF THE INVENTION

As above described, the hard abrasive particle provided by the present invention which comprises the diamond nucleus and cBN grown around the said diamond nucleus have the features of both the hardness equal to diamond and the chemical stability against the iron group metals. And thus the hard abrasive particles can be effectively used as the grinding materials and abrasive compounds for the materials such as cast iron and hardened steels.

What is claimed is:

1. A hard abrasive particle comprising diamond nucleus and a single crystal or polycrystal cubic boron nitride layer coating the surface of said diamond nucleus, characterized in that said diamond nucleus and said cubic boron nitride layer are bonded directly by atoms.

2. A hard abrasive particle as set forth in claim 1, characterized in that said diamond nucleus has particle size of 1 $\mu$m or more but 1,000 $\mu$m or less.

3. A hard abrasive particle as set forth in claim 1, characterized in that a thickness of said cubic boron nitride layer is 1/5 or less times the particle size of said diamond nucleus.

4. A method of producing a hard abrasive particle, in which diamond abrasive particles are coated with cubic boron nitride at high temperatures and high pressures using hexagonal boron nitride as the source, characterized in that said diamond abrasive particles having particle sizes of 1 $\mu$m or more but 1,000 $\mu$m or less are used as seed crystals for growing cubic boron nitride.

5. A method of producing a hard abrasive particle as set forth in claim 4, characterized in that one or more kinds of substances having an oxidized energy at high temperatures and high pressures lower than that of diamond are added to the hexagonal boron nitride source, and diamond abrasive particles as seed crystals.

6. A method of producing a hard abrasive particle as set forth in claim 4, characterized in that at least one member selected from the group consisting of Mg, Al, Ca, V, Ti, and Zr is used as said substances having the low oxidized energy.

7. A method of producing a hard abrasive particle as set forth in claim 4, characterized in that said, hexagonal boron nitride source, diamond abrasive particles as seed crystals is set under the condition of a high-temperature and high-pressure range of 1300° C. or more and 60 kbar or more in which both diamond and cubic boron nitride are thermodynamically stable.

* * * * *